United States Patent [19]

Pütz

[11] Patent Number: 4,869,878
[45] Date of Patent: Sep. 26, 1989

[54] DEVICE FOR CREATION OF AN OXYGEN-FREE WORKING ATMOSPHERE

[75] Inventor: Alban Pütz, Rheinbrohl, Fed. Rep. of Germany

[73] Assignee: APU North America, Inc., Massapequa, N.Y.

[21] Appl. No.: 82,291

[22] Filed: Aug. 6, 1987

[30] Foreign Application Priority Data

Aug. 16, 1986 [DE] Fed. Rep. of Germany ....... 3627763

[51] Int. Cl.$^4$ .............................................. B01J 19/14
[52] U.S. Cl. ................................. 422/111; 422/113; 422/119; 422/129; 422/202; 422/242; 427/422
[58] Field of Search .............. 422/129, 242, 110, 111, 422/113, 119, 202; 417/312; 427/422

[56] References Cited

U.S. PATENT DOCUMENTS 3,493,415  2/1970  Grisaffe et al. ..................... 427/422
4,530,862  7/1985  Kerzel ................................. 427/422
4,573,879  3/1986  Uetuji et al. ........................ 417/312

FOREIGN PATENT DOCUMENTS 3233925  3/1984  Fed. Rep. of Germany .

Primary Examiner—Barry S. Richman
Assistant Examiner—Timothy M. McMahon
Attorney, Agent, or Firm—Davis Hoxie Faithfull & Hapgood

[57] ABSTRACT

An apparatus for providing an oxygen-free working atmosphere wherein the waste gases from a conventional gas burner heating unit are compressed and used as buffer and propellant gases for spray guns for spraying molten metal or ceramic material onto a workpiece, where an expansion chamber is provided between the gas burner and the compressor and a constant pressure is maintained in the expansion chamber which is not less than atmospheric pressure.

13 Claims, 1 Drawing Sheet

DEVICE FOR CREATION OF AN OXYGEN-FREE WORKING ATMOSPHERE

BACKGROUND OF THE INVENTION

Devices are known for the creation of an oxygen-free working atmosphere, or more precisely, a working atmosphere as low in oxygen as possible. In melting metal, a nitrogen or argonate atmosphere serves to avoid oxidation or to hold it to a lower limit. Areas that are to be made safe from fire are connected with pressure tanks that contain compressed nitrogen, carbon dioxide or similar inert gases, and their valves open when a certain temperature limit is exceeded. In particularly high-risk areas, halones (halogenated hydrocarbons) are used. Inert gases are also used as propellant and buffer gases in finishing units to avoid oxidation of the finish or at least to minimize it. However, all previously known inert gases are extremely expensive and must therefore be used sparingly.

After continuous application of metal layers on nonmetallic workpieces became known through German Patent No. 21 42 474 (Spraying of Molten Metals on e.g., Plastic Surfaces), and it became obvious that such sprayed metal surfaces oxidized seriously during spraying and became porous, like sintering. The need to conduct the spraying process in a low-oxygen working atmosphere arose. Through the use of inert gases (argon and helium), a somewhat more homogeneous metal surface was attained; however the costs of the inert gases prevented sufficient use as the buffer gas surrounding the spraying area.

An invention described in German Published Patent Application No. 32 33 925 attempted to eliminate the defects described in the pioneering invention, German Patent No. 21 42 474, without using expensive inert gases. To prevent oxidation of the sprayed metal during the spraying process, combustion waste gases from the combustion of natural gas were used in a working compartment closed on all sides. The spraying took place in this compartment and the combustion waste gases were used in compressed form in the circulation system as propellant gases for the arc spray guns. Combustion waste gases were thus used as essentially oxygen-free propellant and buffer gases in a spraying process.

Completely aside from the fact that working in the spraying compartment required great effort—the operator stretched his hands into the compartment through sleeves and there controlled the spray gun, and due to the restricted space in the compartment, only smaller workpieces could be processed, in the nature of the device—progress with reference to the quality of the sprayed surface was visible, but not satisfactory. Next to surface sections with fine pores, there were necessarily sections with coarser pores. The results were similar to the results from using inert gases as the propellant, as described above.

In industry, combustion gases were used neither as propellant nor buffer gases, nor in melting metal, nor in the finishing process, certainly for the reasons mentioned above. Because the propellant or buffer gas pressure varied constantly, greater or lesser amounts of outside atmospheric air could penetrate and the results remained uneven. The pressure variations at the spray guns had an effect back on the gas burner and disturbed the combustion process; with larger pressure variations, (i.e., backpressure), the burner might even be extinguished, so that it was possible to create an automatic system only to a limited extent. The use of combustion gases as fire-extinguishing gases thus was precluded from the first.

The present invention starts from the state of the art described in German Published Patent Application No. 32 33 925. The object of this invention is to eliminate the defects that impaired the prior art apparatus and process, as well as the known use of inert gases as propellant and buffer gases. It is a further object of this invention to create a combustion gas as a neutral propellant and buffer gas that is uniform in terms of pressure and composition at the point of application. It is also an object of the invention to provide an apparatus capable of producing such inert gases economically in the desired large quantities, and that could be used anywhere without problems.

These objects of the invention are met by the use of the apparatus and process described below and in the claims.

SUMMARY OF THE INVENTION

In this device, the waste gases from a conventional or standard commercial gas burner or heating unit are used as an inexpensive source of buffer and propellant gases, particularly for spray guns for spraying molten metal or ceramic material onto a workpiece in a controlled environment, as well as for other industrial applications, e.g., in a finishing plant, or as a buffer gas in a molten metal unit.

Such a use of waste gases from combustion has in the past been largely precluded because the combustion gases flowed irregularly. Every change in pressure at the working location had an effect on conditions at the burner, with a corresponding subsequent effect on the compressor and at the working location. It was not previously possible, therefore, to attain a truly sheetlike, compact coating on the workpiece when spraying with molten metal; rather, the coating remained similar to sintering and was porous.

A constant flow of combustion gases of constant and uniform composition is provided by the present invention, in that an atmospheric separator in the form of a pressure-free expansion chamber is installed between the gas burner and the compressor. It thus becomes possible for the first time, with this invention, for example, to produce precise metal forms with polishable surfaces for injection molding with plastics using a spraying process.

DESCRIPTION OF THE DRAWING

Based on the drawing, a method of embodiment of the invention is presented and explained below.

The figure shows schematically an apparatus, pursuant to the invention, for the creation of a practically oxygen-free working atmosphere.

DETAILED DESCRIPTION

Figure 1:
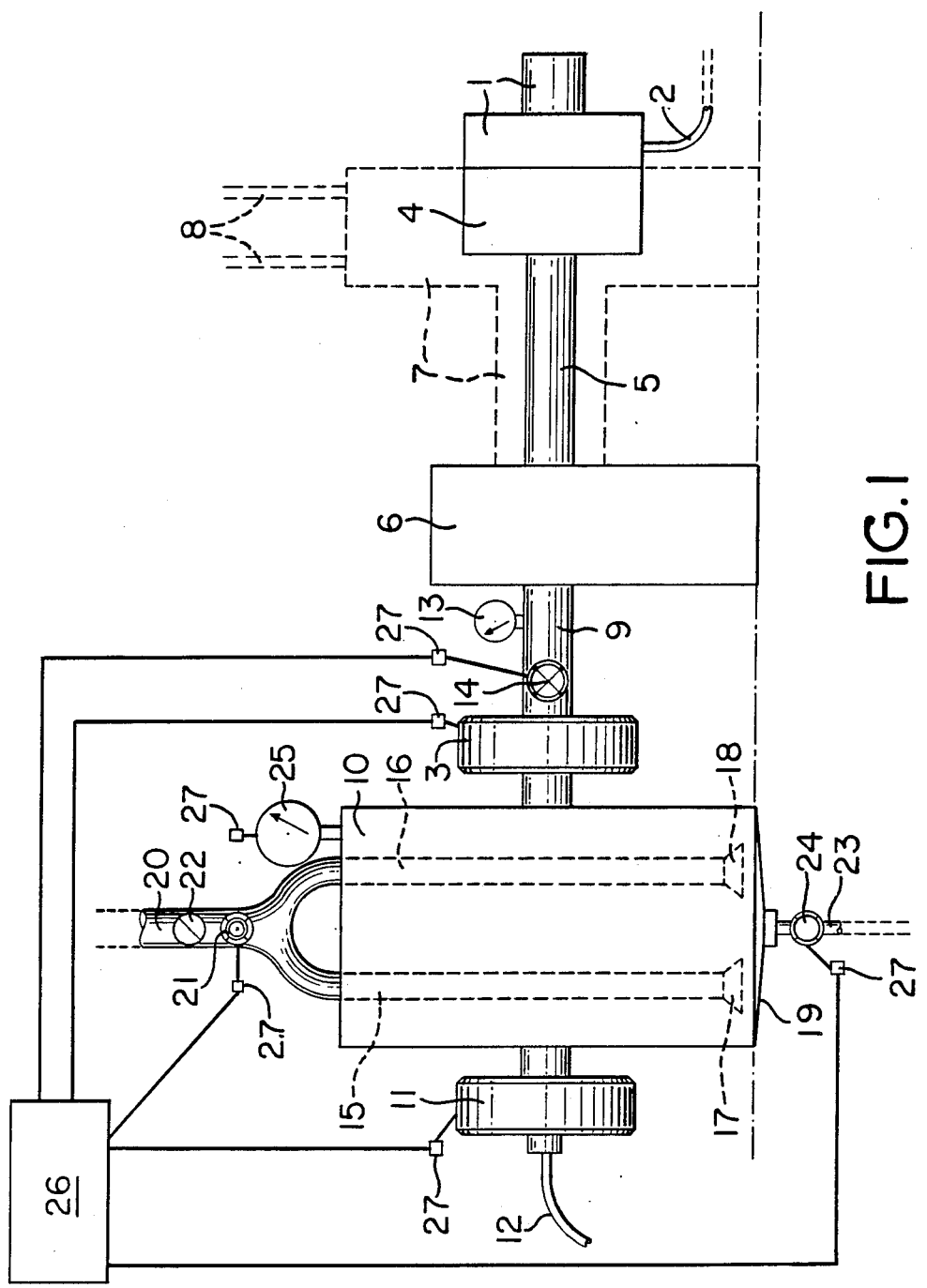

The method of embodiment predominantly refers to the production of propellant and buffer gases for a spray gun with which molten metal or ceramic is applied to a workpiece; the apparatus is, however, usable in the same form for all industrial purposes that may be applicable.

Gas burner 1, a standard commercial burner, e.g., for central heating plants, is supplied with natural gas or propane gas through pipeline 2. Modern, standard commercial burners are set up by the manufacturer in such manner that no carbon monoxide (CO) arises during combustion; therefore, CO can be left out of all further considerations.

Due to suction created by suction fan 3, the CO-free combustion waste gases move from combustion chamber 4 through fire pipe 5 into cooling unit 6, where they are cooled in known manner. Combustion chamber 4 and fire pipe 5 are surrounded by heat-exchanger 7; the heat created in the heat-exchanger can be recovered for other uses via heat conductors 8, (for room heating, hot-water production or the like.)

When required, a gas filter (not shown) can be installed in cooling unit 6. The now cooled combustion waste gases flow from cooling unit 6 through connecting pipe 9 and suction fan 3 and are discharged into expansion chamber 10, which is maintained at a pressure that is slightly higher than the pressure of the outside or ambient atmosphere. In a pilot unit the pressure was maintained at 20 to 30 mbars over atmospheric. Suction fan 3 produced a pressure of approximately 300 mbars in the pilot unit, and the combustion gases expanded when they entered expansion chamber 10; the water content condensed in part and the heavier parts of the gases sank.

Compressor 11 draws the combustion gases out of expansion chamber 10 and compresses them to the operating pressure of the spray gun (not shown) that is connected to feed line 12. This operating pressure is between 2 and 6 bars.

Carbon monoxide ($CO_2$) measuring device 13 and butterfly valve 14 are installed at connecting pipe 9. Two vertical pressure equalization pipes 15, 16, are located in expansion chamber 10; their collar-like ends 17, 18 near the floor end slightly above the floor 19 of expansion chamber 10. The two pressure equalization pipes 15, 16 exit upwards from expansion chamber 10; in a preferred embodiment they join to form a single collecting pipe 20 that opens into a chimney or similar outlet. The number of pressure equalization pipes depends on the open cross-section of expansion chamber 10; the total amount of pressure equalization pipe cross-section must be equal to the cross-section of the inlet opening of connecting pipe 9 in expansion chamber 10, and collecting pipe 20 must also have the same cross-section.

Collecting pipe 20 is provided with butterfly valve 21 and check valve 22; check valve 22 is intended to prevent penetration of outside air containing oxygen into the expansion chamber due to extreme variations in the apparent outside atmospheric pressure caused by gusty winds or the like.

In the middle of slightly conical floor 19 of expansion chamber 10 there is outlet pipe 23 with valve 24; outlet pipe 23 serves to draw off condensed water, but also serves as a pressure equalizer in case of overpressure. In larger expansion chambers, a check valve (not shown) may also be installed on outlet pipe 23.

The device pursuant to the invention functions a follows: the combustion waste gases moved by suction fan 3 through heat-exchanger 7 and cooling unit 6 are under a pressure of 200 to 300 mbars above the pressure of the outside atmosphere (values from pilot unit, may vary in other units) when leaving suction fan 3. When the combustion gases enter expansion chamber 10, in which there is a pressure of approximately 20 to 50 mbars, a large portion of the water vapor condenses and collects on chamber floor 19. The heavier portions of the combustion waste gases also sink; among these are residual traces of oxygen. Under the influence of the slight overpressure, they are conveyed through pressure equalization pipes 15, 16 and collecting pipe 20 into the outside atmosphere.

The combustion waste gases are sucked into compressor 11 from the practically pressure-free expansion chamber 10 and are compressed to operating pressure (6 bars, for the spray gun in the pilot unit).

The effect of expansion chamber 1?, pursuant to the invention, is attained through controlling the pressure ratios. The pressure values mentioned above are only a reference point for this; the principle that atmospheric pressure or a slight security overpressure should be maintained is the governing factor here. This is attained through the corresponding use of butterfly valves 14 and 21 as well as valve 24, if necessary, and the rotational speed of the suction fan. The combustion process is checked at $CO_2$ measuring device 13.

Control of pressure ratios by butterfly valves 14 and 21 and valve 24 is facilitated by the fact that the total cross-section of equalization pipes 15, 16 and the cross-section of collecting pipe 20 are each equal to the inlet cross-section of connecting pipe 9.

In a device that supplies only one or perhaps two or three spray guns with propellant and buffer gas, pressure control and pressure monitoring can be managed by the operator. In this method of embodiment, arc guns are used instead of spray guns for spraying molten metal or ceramic; but the combustion gases can also be used as propellant and buffer gases for gas spray guns.

In the case of a large unit installed as a central unit for several work stations, in which buffer and propellant gases are produced on a larger scale, either for a number of spray guns or for other purposes for which a cheap inert gas is required in large amounts (melting metals), it is expedient to equip the device with automatic pressure regulation. For example, such pressure regulation can be managed by automatic pressure regulator 25 and associated control unit 26 and with associated means 27, illustrated schematically, that regulate valves 14, 21 and 24 and the rotational speed of the suction fan 3 and the compressor 12 in such manner that there is always a slight overpressure (20–50 mbars) in expansion chamber 10.

If the device is intended to operate as a fire-extinguishing unit, it is connected with the areas to be safeguarded through feed lines 12; gas burner 1 is separated from the individual areas by temperature-controlled switches (not shown). In comparison to the known inert-gas extinguishing units, the device pursuant to the invention offers the advantage of providing practically any amount of combustion gas; the usable quantity per interval of time depends only on the capacity of the unit. The length of the effective period is unlimited. Since there are no pressure variations in the combustion gas lines 5, 9 between gas burner 1 and expansion chamber 10, and an increase in pressure is impossible, gas burner 1 can operate reliably under all circumstances, and can therefore be allowed to run automatically without supervision.

The principle of the invention is shown clearly by the method of embodiment. Suction fan 3, connecting pipe 9 and fire pipe 5, together with gas burner 1, form a closed system that functions somewhat like the usual central heating systems. The air current created by the chimney in a central heating unit is simulated by the suction fan, in that suction pressure and pipe dimensions 5 and 9 are dimensioned correspondingly. Combustion therefore occurs without disturbance and reliably, just as in the usual central heating unit, but is even more steady due to the lack of pressure reverses in the chimney.

For the compressor, expansion chamber 10 represents an "atmosphere" consisting of combustion gases, separated from gas burner 1; it therefore functions as if it compressed undisturbed outside air. Here again, there is no room for pressure variations in the feed area; the pressure reverses which arise when the spray stream encounters the workpiece end at the spray guns and can never affect the burner. It is, however, essential that the pressure in the expansion chamber is kept constantly somewhat above the pressure of the outside atmosphere.

What is claimed is:

1. In an apparatus for the oxygen-free spraying of a coating media, comprising a gas burner wherein a fuel, such as natural gas or propane gas is converted into an essentially oxygen-free combustion waste gas in a combustion chamber of said gas burner, and said water gas from the gas burner is subsequently compressed in a compressor and conveyed to a work station having therein spraying means, the improvement comprising an expansion chamber between the gas burner and the compressor in which a substantially constant pressure is maintained which is characterized by an expansion chamber comprising an inlet pipe for admitting waste gas from the gas burner, and outlet pipe for delivering waste gas to the compressor and at least one vertical pressure equalization pipe one end of which communicates with the atmosphere outside the expansion chamber and the other end of which terminates proximate the floor of the expansion chamber and means cooperating with the pressure equalization pipe to regulate the pressure of the waste gas in the expansion chamber relative to the outside atmospheric pressure.

2. The apparatus of claim 1 which includes means for maintaining the pressure in the expansion chamber at, or slightly above the ambient atmospheric pressure.

3. The apparatus of claim 2 in which the means for maintaining the pressure in the expansion chamber maintains pressure 20 to 50 mbars higher than the pressure of the outside atmosphere.

4. The apparatus of claim 1 in which the expansion chamber contains two or more pressure equalization pipes communicating with the atmosphere.

5. The apparatus of claim 1 in which the total cross-sectional area of the one or more pressure equalization pipes is approximately equal to the cross-sectional area of the gas inlet pipe.

6. The apparatus of claim 4 or 5 in which both the inlet pipe and the pressure equalization pipe are each provided with a butterfly valve.

7. The apparatus of claim 4 or 5 in which a check valve is installed in each equalization pipe communicating with the atmosphere.

8. The apparatus of claim 4 or 5 in which a carbon dioxide measuring device is installed in the inlet pipe connecting the expansion chamber to the gas burner.

9. The apparatus of claim 4, which further comprises a fire pipe and a cooling unit downstream of the combustion chamber and before said expansion chamber.

10. The apparatus of claim 9 which further comprises a heat exchanger in contact with the combustion chamber and fire pipe.

11. The apparatus of claim 9 which further comprises a suction fan downstream of the cooling unit and before said expansion chamber.

12. The apparatus of claim 11 which also comprises a conduit containing a butterfly valve between the cooling unit and suction fan.

13. The apparatus of claim 12, which further comprises an automatic pressure regulator control unit communicating with the expansion chamber and means responsive to said control unit to operatively control the butterfly valve and the rotational speed of the suction fan and the compressor in response to variations of pressure inside of the expansion chamber.

* * * * *

UNITED STATES PATENT AND TRADEMARK OFFICE
CERTIFICATE OF CORRECTION

PATENT NO. : 4,869,878

DATED : September 26, 1989

INVENTOR(S) : Alban Putz

It is certified that error appears in the above-identified patent and that said Letters Patent is hereby corrected as shown below:

Column 3, line 58, after "functions", delete "a" and insert --as--.

Column 4, line 9, after "chamber", delete "1?" and insert --10--.

In the Claims:

Claim 1, Column 5, line 21, after "said" (second occurrence), delete "water" and insert --waste--.

Signed and Sealed this

Twenty-first Day of May, 1991

Attest:

HARRY F. MANBECK, JR.

Attesting Officer

Commissioner of Patents and Trademarks